2,999,046
METHOD OF DESTROYING FUNGI AND NEMATODES EMPLOYING 2,2'-(p-XYLENE)-BIS-[2-THIOPSEUDOUREA] DIHYDROCHLORIDE
Irving Rosen, Painesville, Ohio, assignor to Diamond Alkali Company, Cleveland, Ohio, a corporation of Delaware
No Drawing. Filed Aug. 25, 1958, Ser. No. 757,105
2 Claims. (Cl. 167—30)

This invention relates to thiuronium compounds represented by the structure (I)
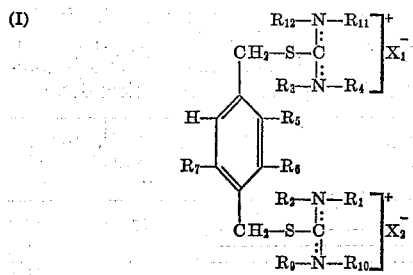

wherein $X_1$ and $X_2$ are halogen atoms, e.g., fluorine, chlorine, bromine, and iodine, chlorine being preferred, $R_1$, $R_2$, $R_3$, $R_4$, $R_9$, $R_{10}$, $R_{11}$, and $R_{12}$ are selected from the group consisting of hydrogen atoms, alkyl radicals, such as methyl, ethyl, propyl, butyl, octyl, and allyl radicals and the like, preferably lower alkyl radicals, aryl radicals, such as phenyl and naphthyl radicals, halogen-substituted alkyl radicals, e.g., chloroloweralkyl and bromoloweralkyl radicals, such as trichloromethyl radicals, tribromoethyl radicals, and diiodobutyl radicals, nitro radicals, alkoxy radicals, such as methoxy radicals, butyloxy radicals, propyloxy radicals, and octyloxy radicals, preferably lower alkoxy radicals, alkaryl radicals, such as tolyl and xylyl radicals, aralkyl radicals, such as benzyl and phenethyl radicals, halogen atoms, e.g., as previously defined, chlorine being preferred, and substituted derivatives of the foregoing radicals, such derivatives having preferably no more than 30 carbon atoms; $R_5$, $R_6$, and $R_7$ are selected from the group consisting of hydrogen atoms, alkyl radicals, as defined, and halogen atoms, as defined, and to their preparation and application.

More specifically, the present invention deals with thiuronium compounds represented by the structure (II)
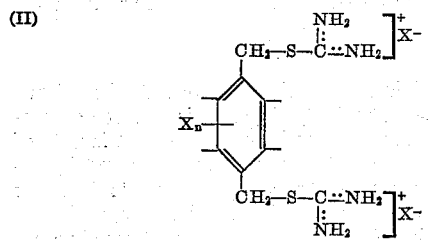

wherein X is a halogen atom, e.g., as previously defined, chlorine being preferred, n is a number from 0 to 3, inclusive, any free bonds being satisfied by hydrogen.

Preferred compounds of the present invention are 2,2'-(p - xylene) - bis[2 - thiopseudourea]dihydrohalides, e.g., 2,2' - (p-xylene) - bis[2-thiopseudourea]dihydrochloride, and 2,2' - (p-xylene) - bis[2-thiopseudourea]dihydrobromide.

Specific compounds within the scope of this invention are (1) 2,2' - (p-xylene) - alpha,alpha'-bis-[1-methyl-2-thiopseudourea]dihydrochloride
(2) 2,2' - (p-xylene) - alpha,alpha' - bis-[1-phenyl-2-thiopseudourea]dihydrochloride
(3) 2,2' - (p-xylene)-alpha,alpha'-bis-[1-allyl-2-thiopseudourea]dihydrobromide
(4) 2,2'-(2,5-dichloro-p-xylene)-alpha,alpha'-bis-[2-thiopseudourea]dihydrochloride
(5) 2,2'-(2-bromo-p-xylene)-alpha,alpha'-bis-[1-methyl-2-thiopseudourea]dihydrochloride
(6) 2,2'-(2,5-dichloro-p-xylene)-alpha,alpha'-bis-[1-propyl-2-thiopseudourea]dihydrochloride
(7) 2,2' - (2-methyl-p-xylene) - alpha,alpha' - bis-[2-thiopseudourea]dihydroiodide
(8) 2,2' - (p-xylene)-alpha,alpha'-bis-[1,1-dibutyl-2-thiopseudourea]dihydrochloride Compounds of this invention may be prepared by chemically reacting a substituted thiourea represented by the structure (III)
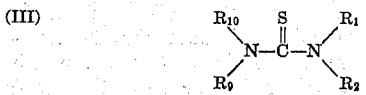

with a p-xylylene dihalide of the structure (IV)
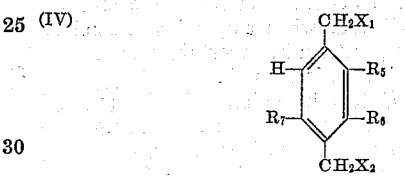

wherein $X_1$ and $X_2$ are halogen atoms, as previously defined, preferably chlorine, $R_5$, $R_6$, and $R_7$ are selected from the group consisting of hydrogen atoms, halogen atoms, and alkyl radicals, as previously defined, preferably lower alkyl radicals; $R_1$, $R_2$, $R_9$, and $R_{10}$ are selected from the group consisting of hydrogen atoms, alkyl radicals, such as methyl, ethyl, propyl, butyl, octyl, and allyl radicals, and the like, preferably lower alkyl radicals, aryl radicals, such as phenyl and naphthyl radicals, halogen-substituted alkyl radicals, e.g., chloroloweralkyl and bromoloweralkyl radicals, such as trichloromethyl, tribromoethyl, and diiodobutyl, nitro radicals, alkoxy radicals, such as methoxy, butyloxy, propyloxy, and octyloxy radicals, preferably lower alkoxy radicals, alkaryl radicals, such as tolyl and xylyl radicals, aralkyl radicals, such as benzyl and phenethyl radicals, halogen atoms, e.g., as previously defined, chlorine being preferred, and substituted derivatives of the foregoing, such derivatives having no more than 30 carbon atoms.

More specifically, compounds of this invention are prepared by chemically reacting thiourea and a halogenated p-xylylene dihalide of the structure (V)

wherein $X'$, $X_1$, and $X_2$ are halogen atoms as previously defined, n is a number from 1 to 3, any free bonds being satisfied by hydrogen.

Preferred compounds of this invention are prepared by chemically reacting p-xylylene dihalide and thiourea. Specific preparations within the scope of this invention are listed in Table I in which any compound in Column 1, Substituted Thiourea, may be reacted with a compound in Column 2, p-Xylylene Dihalide.

TABLE I

| Substituted Thioureas | p-Xylene Dihalide |
|---|---|
| allyl thiourea | p-xylylene dichloride. |
| benzoyl thiourea | p-xylylene dibromide. |
| benzyl thiourea | p-xylylene diiodide. |
| butyl thiourea | |
| t-butyl thiourea | trichloro-p-xylylene dibromide. |
| N,N-diphenyl thiourea | dibromo-p-xylylene dibromide. |
| methyl thiourea | dichloro-p-xylylene dibromide. |
| nitro thiourea | |
| propyl thiourea | |
| m-tolyl thiourea | |

Typically, the above preparations are carried out in the presence of a solvent, such as water or organic solvents, e.g., ketones, butanone, acetone, or 3-hexanone, but preferably in the presence of alcohols, such as ethanol, methanol, propanol, and butanol. Reaction temperature is typically below the decomposition temperature of the reactants; however, the combination may take place in a molten state in a bomb, but preferably below 100° C., i.e., 20° to 80° C. In general, the reactants are combined in substantially stoichiometric ratios; however, considerable departure from these ratios can be tolerated in many instances without serious detriment to either yields or quality of product. Reaction time is typically less than about 36 hours, e.g., up to about 24 hours at 20° C., and up to two hours at 80° C. Preferably the reaction occurs within one-half hour when employing ethanol as a solvent at reflux temperature; however, the reaction occurs in seconds if carried out in a bomb.

The compounds of this invention may be purified through means common in the art, typically through recrystallization from a solvent, such as water, methanol, ethanol, and aqueous ethanol.

The compounds of this invention may be used in various applications including biologically-active materials and as chemical intermediates, such as reacting the compounds of the present invention with sodium hydroxide resulting in the isothiourea.

While compounds of this invention may be employed in a variety of applications, biological or otherwise, when employed as biologically-active materials, it will be understood, of course, that such compounds may be utilized in diverse formulations, both liquid and solid, including finely-divided powders and granular materials, solutions, concentrates, emulsifiable concentrates, slurries and the like depending upon the application intended and the formulation media desired.

Thus, it will be appreciated that compounds of this invention may be employed to form biologically-active substances, which compositions may include finely-divided dry or liquid carriers, diluents, extenders, fillers, conditioners, including various clays, diatomaceous earth, talc, spent catalyst, alumina-silica materials, and incorporating liquids, solids, diluents, etc., typically water and various organic liquids, such as kerosene, acetone, benzene, toluene, xylene, and other petroleum distillate fractions or mixtures thereof.

When liquid formulations are employed or dry materials prepared which are to be used in liquid form, it is desirable in certain instances additionally to employ a wetting, emulsifying, or dispersing agent to facilitate use of the formulation, e.g., Triton X-155 (alkyl aryl polyether alcohol, U.S. Patent No. 2,504,064).

Specific surface active agents suitable for this purpose are set forth in articles by J. W. McCutcheon in Soap & Chemical Specialties, vol. 31, Nos. 7 through 10 (1955).

The term "carrier" as employed in the specification is intended to refer broadly to the material constituting a major proportion of a biologically-active or other formulation and hence includes finely-divided materials, both liquids and solids, as aforementioned conventionally used in such applications.

The compounds of this invention may be used alone or in combination with other known biologically-active material, such as fertilizers, chlorinated hydrocarbon, and organic phosphate pesticides.

In order that those skilled in the art may more completely understand the present and the preferred method by which the same may be carried into effect, the following specific examples are offered:

PREPARATION OF 2,2'-(p-XYLENE)-BIS-[2-THIO-PSEUDOUREA]DIHYDROCHLORIDE

Example I 21.0 g. (0.12 mol) of p-xylylene dichloride, 18.2 g. (0.24 mol) of thiourea, 45 ml. of ethyl alcohol, and 1 ml. of $H_2O$ are refluxed for one-half hour. As heating is started a vigorous exothermic reaction occurs leaving essentially a solid mass. This product is permitted to cool to room temperature and filtered, giving a white solid which is recrystallized from water and filtered, yielding 23.5 g. of white crystals. This desired $C_{10}H_{16}Cl_2N_4S_2$ decomposes at approximately 245°–250° C. and is indicated through the following elemental analytical data:

| Element | Actual, Percent by Wt. | Calculated, Percent by Wt. |
|---|---|---|
| C | 37.0 | 36.8 |
| H | 4.89 | 4.93 |
| Cl | 22.2 | 21.7 |
| S | 19.6 | 19.6 |

Example II

In order to make an in vitro evaluation of the product of Example I as a contact poison, non-plant parasite nematodes (*Panagrellus redivivus*) are exposed to the test chemical in small watch glasses (27 ml. diameter x 8 ml. deep), within a 9 cm. Petri dish. An aqueous formulation (2500 p.p.m. product of Example I, 5% acetone, 0.01% Triton X-155, balance water) is used. Results are recorded 24 hours after treatment showing 100% mortality.

Example III

In order to demonstrate insecticidal activity of the product of Example I, male German cockroaches, *Blattella germanica*, 8 to 9 weeks old are anesthetized with carbon dioxide to facilitate handling and then dipped in a test formulation (2000 p.p.m. of the product of Example I, 5% acetone, 0.01% Triton X-155, balance water) for 10 seconds, removed, freed of excess liquid, and caged. Two lots of 10 insects each are exposed to this formulation and mortality observations are recorded after three days. Using this procedure at the above concentration, the product of Example I proves to be significantly lethal to the above insects.

Example IV

Further insecticidal evaluation is shown in the following test: The bean aphid, *Aphis fabae*, is cultured on nasturtium plants. No attempt is made to select insects of a given age in this test. Test pots are prepared by reducing the number of nasturtium plants in 2½" culture pots until those remaining are infested with approximately 100 aphids. The infested test plants are treated with a formulation of the test chemical (2000 p.p.m. product of Example I, 5% acetone, 0.01% Triton X-155, balance water). Based on counts made 24 hours after exposure the product of Example I caused better than 40% mortality of the above insects.

Example V

Further evaluation is carried out using adult two-spotted spider mites, *Tetranychus bimaculatus*, maintained on Tendergreen beans, under controlled conditions. Young bean plants 3" to 4" tall, thinned to two plants per 2½" pot are treated by pouring a formulation (2000 p.p.m. product of Example I, 5% acetone, 0.01% Triton X-155, balance water) on the soil at a rate equivalent to 64 pounds per acre. 24 hours later the four seed leaves in each pot are infested by leaf cuttings from Tendergreen bean plants infested with the said spider mite. Counts are recorded two days after the plants are infested showing better than 65% mortality.

*Example VI*

Further fungicidal utility is demonstrated using spore germination tests on glass slides conducted by the test tube dilution method adopted from the procedure recommended by the American Phytopathological Society's Committee on Standardization of Fungicidal Tests. In this procedure the product of Example I in aqueous formulation at concentrations of 1000, 100, 10, and 1.0 p.p.m. is tested for its ability to inhibit germination of spores from 7 to 10-day old cultures of *Alternaria oleracea* and *Monilinia fructicola*. These concentrations refer to initial concentrations before diluting four volumes with one volume of spore stimulant and spore suspension. Germination records are taken after 20 hours of incubation at 22° by counting 100 spores. Results indicate that concentrations of 10 to 100 p.p.m. afford disease control for both the *A. oleracea* and *M. fructicola*.

*Example VII*

Fungicidal utility is further demonstrated by the ability of the product of Example I to protect tomato plants against the Late blight fungus, *Phytophthora infestans*. The method employs tomato plants 5" to 7" high of the variety Bonny Best. 100 ml. of the test formulation, i.e., 2000 p.p.m. and 400 p.p.m. test chemical, 5% acetone, 0.01% Triton X-155, and the balance water, is sprayed on plants at 40 pounds air pressure while the plants are being rotated on a turntable on a spray chamber. After the spray deposit is dry, the treated plants and comparable untreated controls are sprayed with a spore suspension containing approximately 150,000 sporangia of *P. infestans* per ml. The plants are held in a 100% humid atmosphere for 24 hours at 60° F. to permit spore germination and infection. After two to four days, lesion counts are made on the three uppermost fully expanded leaves comparing the number of lesions on the test plants and control plants shows disease control of 91% and 48% at the 2000 p.p.m. and 400 p.p.m. concentrations, respectively.

It is to be understood that although the invention has been described with specific reference to particular embodiments thereof, it is not to be so limited since changes and alterations therein may be made which are within the full intended scope of this invention as defined by the appended claims.

What is claimed is:
1. The method of controlling fungus growth on plants which comprises contacting said fungus and plants with an active amount of 2,2'-(p-xylene)-bis-[2-thiopseudourea]dihydrochloride.
2. The method of controlling nematode growth on plants which comprises contacting said nematodes with a nematocidal amount of 2,2'-(p-xylene)-bis-[2-thiopseudourea]dihydrochloride.

References Cited in the file of this patent

UNITED STATES PATENTS

| | | |
|---|---|---|
| 2,347,827 | Hunt | May 2, 1944 |
| 2,419,073 | Hammer | Apr. 15, 1947 |
| 2,448,265 | Kagy | Aug. 31, 1948 |
| 2,514,650 | Knott et al. | July 11, 1950 |
| 2,726,485 | Thomas | Dec. 13, 1955 |
| 2,730,547 | Dye | Jan. 10, 1956 |
| 2,743,209 | Jones | Apr. 24, 1956 |
| 2,757,117 | Birum | July 31, 1956 |
| 2,770,638 | Grolito | Nov. 13, 1956 |
| 2,779,680 | Wolf | Jan. 29, 1957 |
| 2,802,021 | Heininger | Aug. 6, 1957 |
| 2,802,831 | Wheeler | Aug. 13, 1957 |

OTHER REFERENCES

Benington et al.: J. Org. Chem., vol. 20, pp. 102–8.
Kulka et al.: Can. J. Chem., vol. 33, pp. 1130–6.
Musgrave et al.: Chemical Abstracts, vol. 50, p. 1251.